United States Patent
Jaeger

[11] Patent Number: 6,135,058
[45] Date of Patent: Oct. 24, 2000

[54] SANITARY CAT LITTER BOX AND METHOD OF USE

[76] Inventor: Alice Jaeger, 447 Triton Rd., Ormond Beach, Fla. 32176

[21] Appl. No.: 09/497,223

[22] Filed: Feb. 3, 2000

[51] Int. Cl.[7] .................................................. A01K 29/00
[52] U.S. Cl. ............................................................. 119/167
[58] Field of Search ................................... 119/165, 166, 119/167, 168, 169, 170; 383/66, 41, 109

[56] References Cited

U.S. PATENT DOCUMENTS

| | | |
|---|---|---|
| 3,809,013 | 5/1974 | Rigney et al. . |
| 4,312,295 | 1/1982 | Harrington . |
| 4,352,340 | 10/1982 | Strubelt ..................................... 119/167 |
| 4,615,300 | 10/1986 | McDonough . |
| 4,760,816 | 8/1988 | Rhodes ..................................... 119/165 |
| 4,951,605 | 8/1990 | Brown ....................................... 119/165 |
| 5,038,721 | 8/1991 | Ouellette et al. . |
| 5,062,392 | 11/1991 | Lavash . |
| 5,148,774 | 9/1992 | Fields ........................................ 119/165 |
| 5,158,042 | 10/1992 | Hammerslag et al. . |
| 5,207,772 | 5/1993 | Lauretta et al. . |
| 5,325,815 | 7/1994 | Gumpesberger et al. . |
| 5,517,947 | 5/1996 | Christman . |
| 5,551,376 | 9/1996 | Lundeen et al. . |
| 5,564,366 | 10/1996 | Hancock . |
| 5,752,466 | 5/1998 | Lundeen et al. . |
| 5,890,452 | 4/1999 | Lundeen et al. . |
| 5,893,336 | 4/1999 | Vice et al. . |

*Primary Examiner*—Thomas Price
*Attorney, Agent, or Firm*—Paul S. Rooy

[57] ABSTRACT

A sanitary cat litter box and method of use. The sanitary cat litter box comprises a box top sized to frictionally fit onto a box bottom, an impervious bag sized to fit into the box bottom, and at least one sieve bag nested in the impervious bag. The box has a box mouth and a box aperture. The impervious bag has an impervious bag mouth co-extensive with the box mouth and an impervious bag aperture co-extensive with the box aperture. Each sieve bag has a sieve bag mouth co-extensive with the box mouth and a sieve bag aperture co-extensive with the box aperture. Means is provided to hold the corresponding box, impervious bag, and sieve bag mouths together, and to hold the corresponding box, impervious bag, and sieve bag apertures together. In use, the sieve bag(s) and impervious bag are placed within the box bottom, and the corresponding apertures attached. Cat litter is placed in the uppermost sieve bag, the corresponding mouths are attached, and the box top is installed on the box bottom. Each day, one sieve bag containing lumped cat litter and cat waste is removed from the sanitary cat litter box, and discarded. On the last day, only the impervious bag containing the remainder of the cat litter and any accumulated cat waste is removed and discarded, and a new sieve bag/impervious bag package is installed in the box bottom.

17 Claims, 5 Drawing Sheets

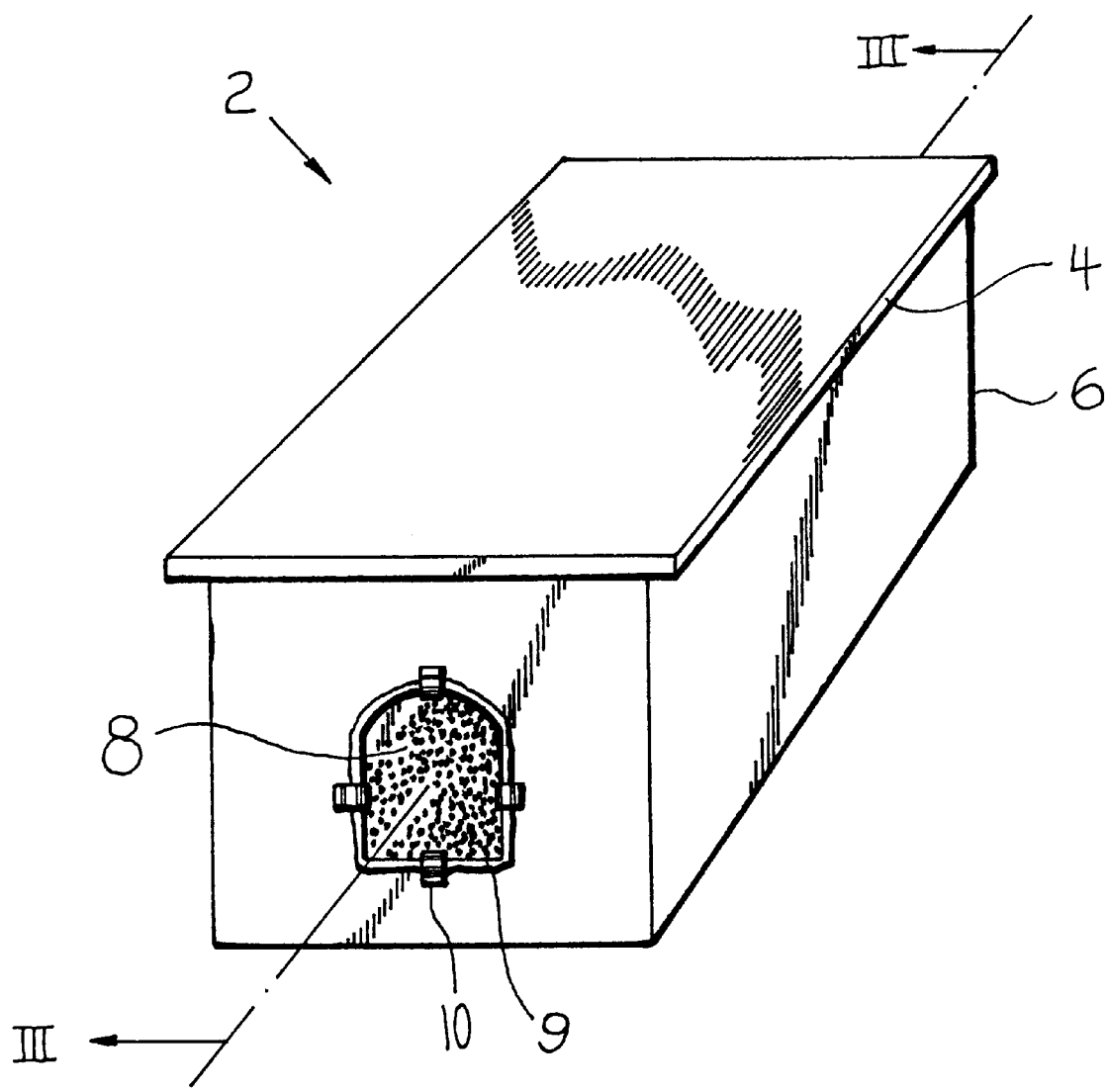

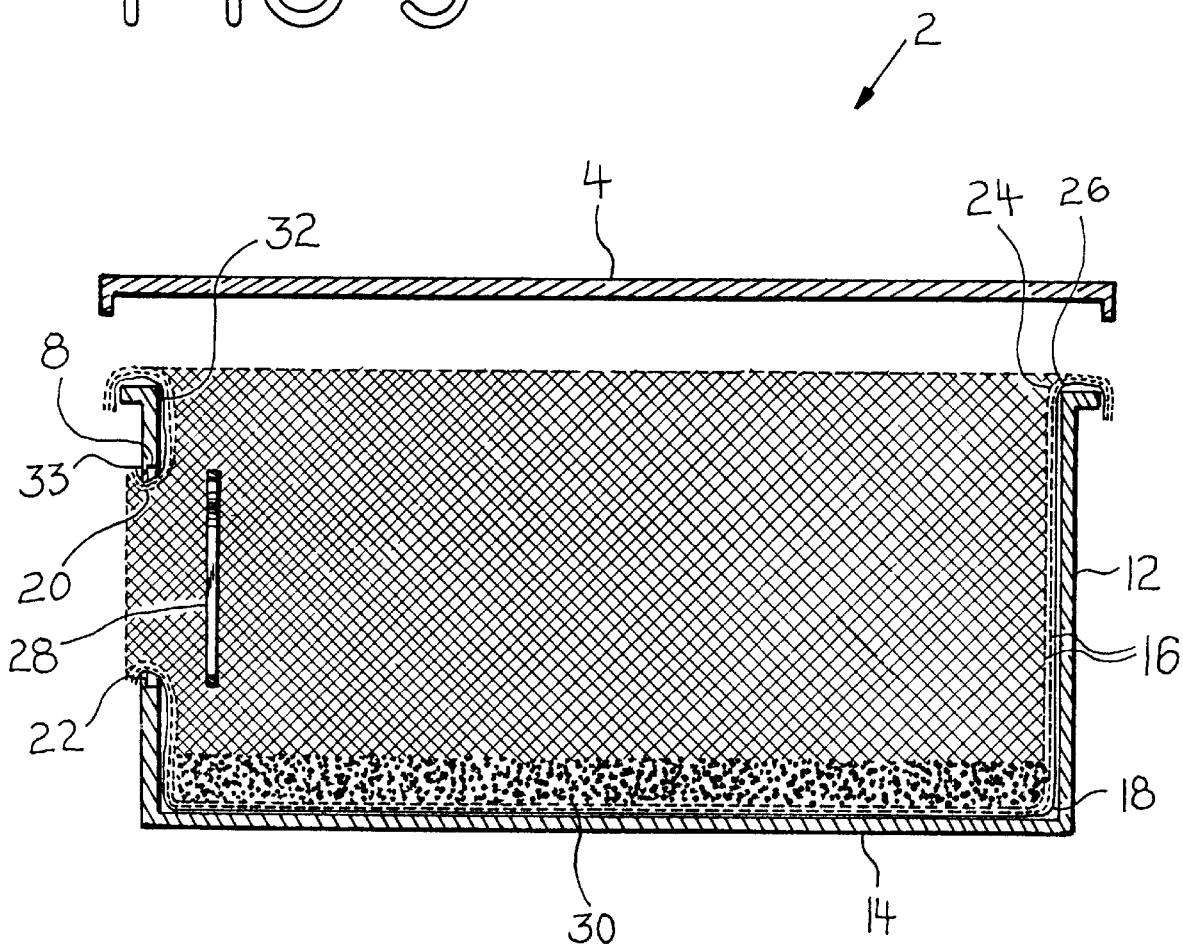
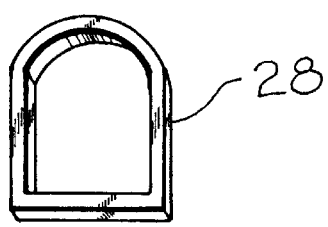

SANITARY CAT LITTER BOX AND METHOD OF USE

BACKGROUND OF THE INVENTION

1. Field of the Invention

This invention relates to cat litter boxes, and in particular to a sanitary cat litter box and method of use.

2. Background of the Invention

It is believed in the scientific community that cats developed from a small animal which resembled a weasel called a Miacis. The Miacis lived more than 50 million years ago, and is also believed to be the ancestor of other mammals such as bears, dogs and raccoons.

It is not known when cats were first tamed, but many believe the ancient Egyptians first domesticated cats descended from African wildcats as early as 3500 BC. These cats killed mice, rats and snakes, thus preventing these pests from infesting Egyptian farms and granaries. By around 1500 BC the Egyptians started regarding cats as sacred. One of their gods was a goddess of love or fertility called Bastet or Bast, and comprised the head of a cat and the body of a woman. Harming cats was illegal, and killing a cat was punishable by death. Like humans who died, deceased cats were mummified; one ancient cat cemetery was found containing more than 300,000 cat mummies.

Mediterranean traders such as Greeks and Phoenicians probably brought cats to Europe and the Middle East ca. 1000 BC. The ancient Greeks and Romans regarded cats highly for their ability to hunt pests such as rodents. Cats became symbols of liberty, and were thought to be the spirit of the household in Rome.

As in Europe, cats gained popularity in the Middle East. Many libraries used them to protect manuscripts from damage caused by mice and rats. In addition, Middle Eastern cats protected silk worm cocoons from rodent attacks, thus contributing to the development of silk as a trading medium. In the Far East, cats became favorite subjects of writers and artists.

During the Middle Ages, Europeans started believing cats were agents of the Devil, and hundreds of thousands were killed. Unfortunately, this slaughter led to a large rise in the population of rats, which then spread the black plague throughout Europe, ultimately killing one quarter of the human population during the 1300's. By the 1600's the surviving Europeans once again realized the pest control value of cats, and cats traveled to the Americas with the colonists. Many cats living today in the United States and Canada are descendants of cats brought over from Europe during the 1600's and 1700's.

Today, cats are prized for their ability to hunt mice, rats and snakes, and to help maintain homes, farms and food storage buildings free from these pests. Additionally, cats can provide fine companionship, and many are kept as pets. More than 40 million domestic cats live in the United States, and more than two million in Canada. Cat care is a billion dollar industry, providing goods and services ranging from cat food, cat litter products, cat toys, veterinary services and cat grooming.

Due to the proliferation of apartments and homes with small yards, many cats in the United States are indoor cats, especially in urban areas. Thus, collection and disposal of cat waste in a clean, sanitary manner has become a major problem.

One wide-spread solution to the cat waste collection/disposal problem is the prior art cat litter box 102 depicted in FIG. 1. In use, prior art cat litter box top 104 is removed, and an impervious plastic liner containing clumping cat litter is placed inside prior art cat litter box bottom 106. Prior art cat litter box top 104 is than replaced, and a cat using prior art cat litter box 102 enters through the front opening, uses the facility, and then exits. The clumping cat litter absorbs urine and forms clumps in the presence of liquid, thus facilitating the removal of urine-soiled litter. Litter clumps and feces are removed using a slotted spoon, and theoretically the remaining litter is then clean enough for re-use.

A number of problems exist associated with prior art cat litter box 102 and its above-described method of use. First, cats tend to spray urine horizontally and even upwards during their ablution ritual. This leads to urine-encrusted litter box walls and even the ceiling becomes contaminated, though to a lesser extend than the walls. While the impervious bottom liner keeps prior art cat litter box bottom clean 106, no such protection exists for prior art cat litter box top 104, and so this latter component must be removed at least weekly, and its inside cleaned out. This chore can take at least 15–20 minutes per week, and sometimes more frequent cleanings are necessary.

Over a period of one year this ads up to around 20 hours spent cleaning the inside of prior art cat litter box top 104! Quite aside from this huge time waste, the chore is not a pleasant one—in fact, in the military latrine duty is actually used as a punishment for incompetence. If prior art cat litter box 102 is not kept clean, the cat(s) intended to use it will vociferously express their displeasure by meowing.

A second problem associated with prior art cat litter box 102 and its method of use is the time spent fishing around for litter clumps and cat feces with the slotted spoon. This activity constitutes a daily ordeal for urban cat owners, and requires several steps. First, prior art cat litter box top 104 must be removed. Second, litter clumps and feces must be visually identified. Third, the slotted spoon is brought into action, and each litter clump and lump of fecal matter be scooped up and placed in a trash receptacle. Finally, prior art cat litter box top 104 must be replaced onto prior art cat litter box bottom 106. Assuming 5 minutes per day expended on this chore, the average urban cat owner spends an astounding 29 hours per year, almost three quarters of a work week, sifting litter clumps and cat feces out of prior art cat litter box 102 with a slotted spoon!

Existing Designs

A number of approaches have been used to address the above problems. One of these is embodied in U.S. Pat. Nos. 5,980,452, 5,551,376, and 5,038,721 granted to Lundeen et al., Lundeen et al., and Ouellette et al. respectively. These patents taught a screen nested within the impervious liner. The screen had a mesh section sized to allow unsoiled litter to pass through the mesh apertures, but to not allow litter clumps and fecal matter lumps to pass through the mesh apertures. Thus, the screen could be removed from prior art cat litter box bottom 106, which action would remove any accumulated cat waste, and leave only unsoiled cat litter within prior art cat litter box 102. While these patents provided an easier way to remove cat litter from prior art cat litter box 102 than the conventional slotted spoon, they did not address the problem of urineencrusted litter box tops. In addition, they taught only one screen, which provided for only one use.

A second approach was disclosed in U.S. Pat. Nos. 5,325,815 and 4,615,300 granted to Gumpesberger and McDonough respectively. These patents taught a plurality of nested rigid screens which could be removed sequentially. While these inventions disclosed a more practical method of use for day-to-day cat waste removal, they were expensive and unwieldy. In addition, they did not teach a solution to the soiled litter box top problem.

Still another approach to the cat litter collection/disposal problem were advanced by a number of patents which disclosed a plurality of flexible sieves or sieve bags nested within the impervious liner. Patents representative of this approach include U.S. Pat. Nos. 5,752,466, 5,564,366, 5,207,772, 5,158,042, 5,062,392, 4312,295 and 3,809,013 granted to Lundeen et al., Hancock, Lauretta et al., Hammerslag et al., Lavash, Harrington and Rigney at al. Although these inventions disclosed a more practical method of use for day-to-day cat waste removal, they did not teach a solution to the soiled litter box top problem.

SUMMARY OF THE INVENTION

Accordingly, it is an object of the present invention to provide a sanitary cat litter box and method of use which prevents its inside cat litter box walls from becoming soiled by cat waste. Design features allowing this object to be accomplished include an impervious bag having impervious bag walls nested within a box bottom having box walls, the impervious bag walls being co-extensive with the box walls from bottom to top. Advantages associated with the accomplishment of this object include elimination of time spent cleaning box walls, and elimination of the distaste associated with this chore.

It is another object of the present invention to provide a sanitary cat litter box and method of use which provides for quick and easy daily removal of cat waste. Design features allowing this object to be accomplished include a plurality of sieve bags nested within an impervious bag, the impervious bag being nested within a box bottom. A benefit associated with the accomplishment of this object is reduction in time spent daily extricating litter clumps and fecal lumps from cat litter.

It is yet another object of this invention to provide a sanitary cat litter box which is economical. Design features allowing this object to be achieved include the use of components made of readily available materials. Benefits associated with reaching this objective include reduced cost, and hence increased availability.

BRIEF DESCRIPTION OF THE DRAWINGS

The invention, together with the other objects, features, aspects and advantages thereof will be more clearly understood from the following in conjunction with the accompanying drawings.

Five sheets of drawings are provided. Sheet one contains FIG. 1. Sheet two contains FIG. 2. Sheet three contains FIGS. 3 and 4. Sheet four contains FIG. 5. Sheet five contains FIG. 6.

FIG. 2 is a front quarter isometric view a sanitary cat litter box.

FIG. 3 is a side cross-sectional view of a sanitary cat litter box taken at section III—III of FIG. 2.

FIG. 4 is a front isometric view of a ring.

DETAILED DESCRIPTION OF THE PREFERRED EMBODIMENT

Figure 1:
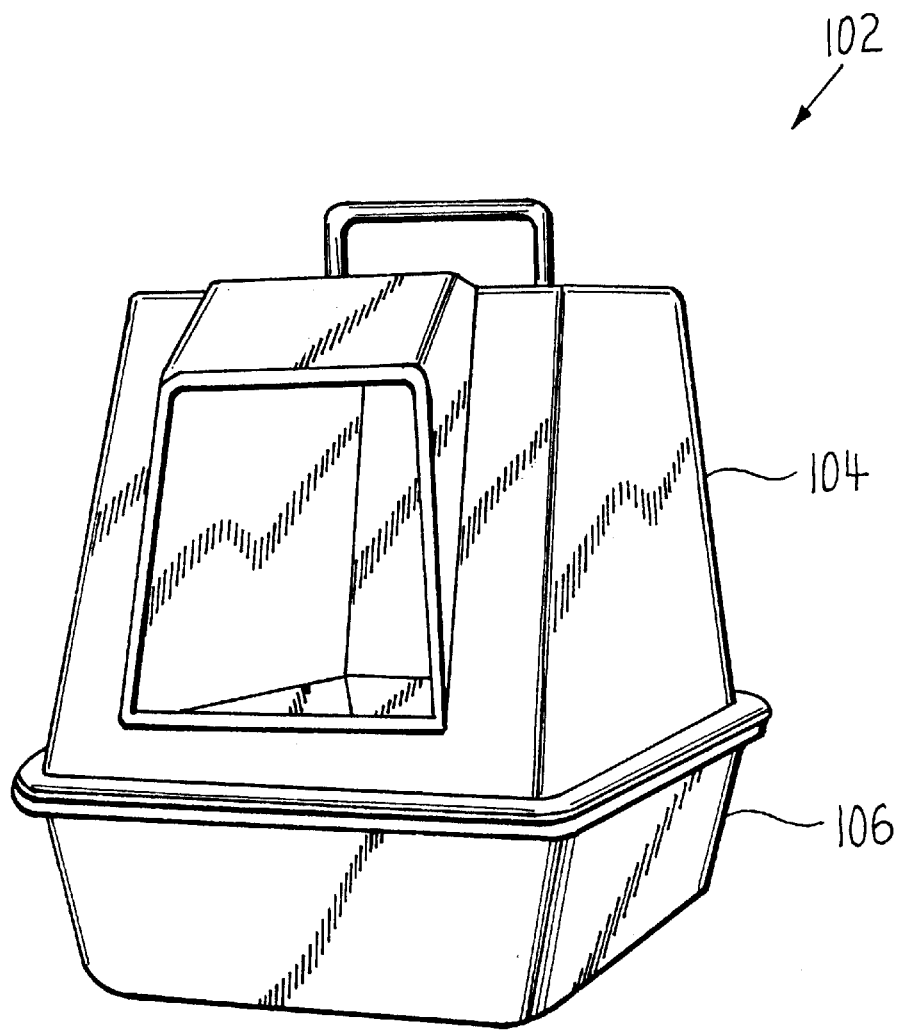
FIG. 1 is a front isometric view of a prior art cat litter box.

Referring now to FIG. 2 we observe a front quarter isometric view sanitary cat litter box 2, and FIG. 3 is a side cross-sectional view of sanitary cat litter box 2 taken at section III—III of FIG. 2. Sanitary cat litter box 2 comprises box top 4 sized to frictionally fit over box bottom 6, one impervious bag 18 nested within box bottom 6, at least one sieve bag 16 nested within impervious bag 18, a means of holding impervious bag aperture 22 and sieve bag aperture (s) 20 open around box aperture 8, and a means of holding impervious bag mouth 26 and sieve bag mouth(s) 24 open co-extensive with box mouth 32. Sieve bags 16 are depicted in cross-section by dotted lines in FIG. 3. FIG. 3 depicts two sieve bags 16 nested within an impervious bag 18, with clumping cat litter 30 placed in the top sieve bag 16, ready for use.

Figure 5:
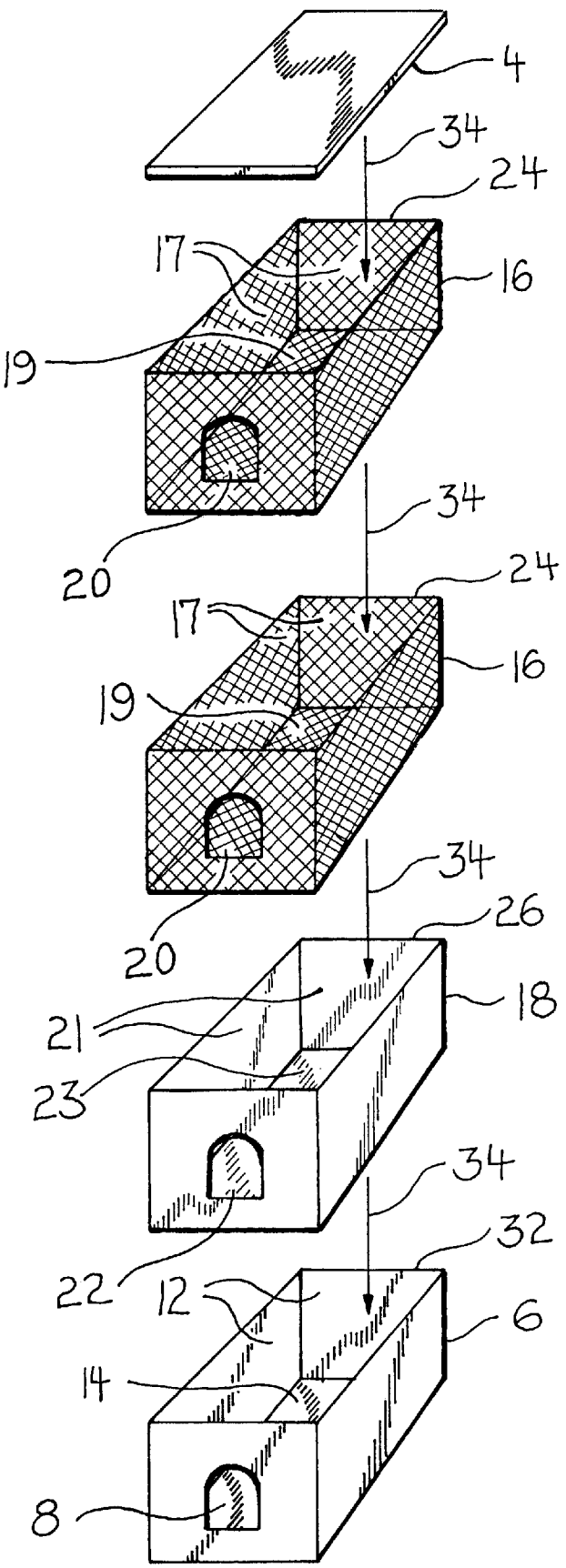
FIG. 5 is a front quarter exploded isometric view of a sanitary cat litter box.

Referring now also to FIG. 5 we observe a front quarter exploded isometric view of sanitary cat litter box 2. Box bottom comprises box aperture 8, a plurality of box walls 12, a box floor 14, and box mouth 32. Impervious bag 18 comprises an impervious bag aperture 22, an impervious bag mouth 26, a plurality of impervious bag walls 21 and an impervious bag floor 23. Each sieve bag 16 comprises a sieve bag aperture 20, a sieve bag mouth 24, a plurality of sieve bag walls 17, and a sieve bag floor 19.

Impervious bag floor 23 and sieve bag floor(s) 19 substantially co-extend with box floor 14. Impervious bag walls 21 and sieve bag walls(s) 17 substantially co-extend with corresponding box walls 12, except impervious bag aperture 22 and sieve bag aperture(s) 20 are slightly smaller than box aperture 8 so as to allow a small amount of impervious bag 18 material and sieve bag(s) 16 material to extend through box aperture 8. In addition, a small amount of impervious bag 18 material and sieve bag(s) 16 material at impervious bag mouth 26 and sieve bag mouth(s) 24 respectively extends through box mouth 32. Impervious bag aperture 22 and sieve bag aperture(s) 20 substantially co-extend with box aperture 8. Impervious bag mouth 26 and sieve bag mouth(s) 24 substantially co-extend with box mouth 32.

As may be observed in FIG. 5, sieve bag(s) 16 and impervious bag 18 are installed into box bottom 6 as indicated by arrows 34. Sieve bag(s) 16 and impervious bag 18 are held in place by virtue of sieve bag 16 material at sieve bag mouth(s) 24 and impervious bag 18 material at impervious bag mouth 26 being sandwiched between box top 4 and box bottom 6.

Figure 6:
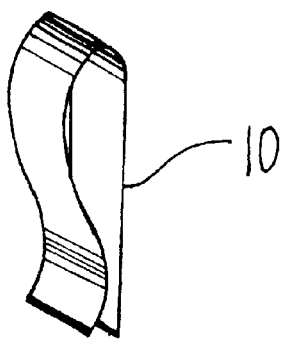
FIG. 6 is a side isometric view of a clip.

As depicted in FIG. 2, sieve bag aperture(s) 20 and impervious bag aperture 22 are held in place co-extensive with box aperture 8 by means of clips 10. A clip 10 is illustrated in FIG. 6. Clips 10 are manufactured of resilient material, and may be installed as shown in FIG. 2.

An alternative means of holding sieve bag aperture(s) 20 and impervious bag aperture 22 in place at box aperture 8 is depicted in FIGS. 3 and 4. In these figures, ring 28 frictionally sized to fit into box aperture 8 is used to sandwich sieve bag 16 material at sieve bag aperture(s) 20 and impervious bag 18 material at impervious bag aperture 22 between box aperture 8 and ring 28. Box aperture lip 33 has a smaller perimeter than ring 28, and acts as a stop to help hold ring 28 in place.

In the preferred embodiment, box top 4, box bottom 6, clips 10 and ring 28 were manufactured of plastic, polymer, other synthetic, or other appropriate material. Impervious bag 18 and sieve bag(s) 16 were manufactured of plastic, synthetic, or other appropriate material. Sieve bags 16 were manufactured of mesh sized at approximately 6 holes per square inch. Sanitary cat litter box 2 was 16 inches tall, and box aperture lower edge 9 was disposed 6–7 inches above a surface upon which sanitary cat litter box 2 rested. Box aperture 8 was large enough to permit an average sized cat to easily pass through.

In an alternate embodiment, a plurality of sieve bags 16 (for example, six of them) may be packaged nested within impervious bag 18, and mutually held in place at their sieve bag mouths 24/impervious bag mouth 26 and/or sieve bag apertures 20/impervious bag aperture 22 with spot welds, adhesive or other appropriate means. The mutual attachment is weak enough to be easily defeated by merely lifting a sieve bag with its waste contents out of the sanitary cat litter box 2, leaving the remaining sieve bags 16 and impervious bag 18 for future use.

For example, where six sieve bags 16 are packaged mutually nested within an impervious bag 18, one sieve bag 16 could be lifted out each day, containing the previous day's accumulation of cat waste, until on the seventh day the impervious bag 18 could be lifted out and discarded with the remaining cat litter and waste. In this example, the sieve bag 16/impervious bag 18 package would last one week, and a new package would be installed on the first day of the following week.

Method of Use:

A. Nesting at least one sieve bag 16 within an impervious bag 18;

B. Placing the at least one sieve bag 16 nested within the impervious bag 18 within a box bottom 6;

C. Attaching impervious bag aperture 22 and sieve bag aperture(s) 20 to bottom 6 at box aperture 8;

D. Placing clumping cat litter 30 within a top sieve bag 16;

E. Attaching impervious bag mouth 26 and the sieve bag mouth(s) 24 to box bottom 6 at box mouth 32 by sandwiching impervious bag 18 material at impervious bag mouth 26 and sieve bag 16 material at sieve bag mouth(s) 24 between box bottom 6 and box top 4;

F. Removing box top 4 and a single sieve bag 16, along with any cat litter clumps and cat feces lumps contained in that sieve bag 16, discarding the sieve bag 16 thus removed, and re-attaching impervious bag mouth 26 and the remaining sieve bag mouth(s) 24 to box bottom 6 at box mouth 32 as specified in step E;

G. Repeating step F until only impervious bag 18 remains within sanitary cat litter box 2; and H. Removing box top 4 and the impervious bag 18 containing the remaining cat litter 30 and any cat litter clumps and cat feces lumps, and discarding the impervious bag 18 along with its contents.

While a preferred embodiment of the invention has been illustrated herein, it is to be understood that changes and variations may be made by those skilled in the art without departing from the spirit of the appending claims.

DRAWING ITEM INDEX

2 sanitary cat litter box
4 box top
6 box bottom
8 box aperture
9 box aperture lower edge
10 clip
12 box wall
14 box floor
16 sieve bag
17 sieve bag wall
18 impervious bag
19 sieve bag floor
20 sieve bag aperture
21 impervious bag wall
22 impervious bag aperture
23 impervious bag floor
24 sieve bag mouth
26 impervious bag mouth
28 ring
30 clumping cat litter
32 box mouth
33 box aperture lip
34 arrow
102 prior art cat litter box
104 prior art cat litter box top
106 prior art cat litter box bottom

I claim:

1. A sanitary cat litter box comprising a box top sized to frictionally fit onto a box bottom, an impervious bag sized to fit into said box bottom, at least one sieve bag sized to nest into said impervious bag, said box bottom comprising a box mouth and a box aperture, said impervious bag comprising an impervious bag mouth and an impervious bag aperture, each said sieve bag comprising a sieve bag mouth and a sieve bag aperture, said impervious bag mouth and each said sieve bag mouth co-extending with said box mouth, said impervious bag aperture and each said sieve bag aperture co-extending with said box aperture, means of holding said impervious bag mouth and each said sieve bag mouth co-extensive with said box mouth, and means of holding said impervious bag aperture and each said sieve bag aperture co-extensive with said box aperture.

2. The sanitary cat litter box of claim 1 wherein said box bottom comprises a plurality of box walls rigidly attached to a box floor and said box aperture is disposed on one said box wall, said impervious bag comprises a plurality of impervious bag walls attached to an impervious bag floor and said impervious bag aperture is disposed on one said impervious bag walls, and each said sieve bag comprises a plurality of sieve bag walls attached to a sieve bag floor and each said sieve bag aperture is disposed on one said sieve bag walls, each said impervious bag wall and sieve bag wall substantially co-extending with a corresponding box wall, said impervious bag floor and each said sieve bag floor substantially co-extending with said box floor.

3. The sanitary cat litter box of claim 2 wherein said means of holding said impervious bag aperture and each said sieve bag aperture co-extensive with said box aperture comprises a plurality of resilient clips disposed around said box aperture.

4. The sanitary cat litter box of claim 2 wherein said means of holding said impervious bag aperture and each said sieve bag aperture co-extensive with said box aperture comprises a ring sized to frictionally fit into said box aperture, impervious bag material at said impervious bag aperture and sieve bag material at said sieve bag aperture being sandwiched between said ring and said box aperture.

5. The sanitary cat litter box of claim 4 wherein said box aperture further comprises a box aperture lip having a smaller perimeter than said ring, whereby said ring is prevented from passing entirely through said box aperture when being installed in said box aperture.

6. The sanitary cat litter box of claim 2 wherein said means of holding said impervious bag mouth and each said sieve bag mouth co-extensive with said box mouth comprises the frictional fit between said box top and said box bottom, impervious bag material at said impervious bag mouth and sieve bag material at said sieve bag mouth being sandwiched between said box top and said box bottom.

7. The sanitary cat litter box of claim 2 wherein a box aperture lower edge is 7±2 inches above a surface upon which the sanitary cat litter box rests.

8. The sanitary cat litter box of claim 2 wherein a height of said box bottom is 16±4 inches.

9. The sanitary cat litter box of claim 1 wherein said at least one sieve bag and said impervious bag are packaged together, said at least one sieve bag mouth and said impervious bag mouth being mutually removably attached.

10. The sanitary cat litter box of claim 9 wherein said at least one sieve bag mouth and said impervious bag mouth are mutually removably attached by means of spot welds around said at least one sieve bag mouth and said impervious bag mouth.

11. The sanitary cat litter box of claim 9 wherein said at least one sieve bag mouth and said impervious bag mouth are mutually removably attached by means of adhesive points around said at least one sieve bag mouth and said impervious bag mouth.

12. The sanitary cat litter box of claim 9 wherein said at least one sieve bag aperture and said impervious bag aperture are mutually removably attached.

13. The sanitary cat litter box of claim 12 wherein said at least one sieve bag aperture and said impervious bag aperture are mutually removably attached by means of spot welds around said at least one sieve bag aperture and said impervious bag aperture.

14. The sanitary cat litter box of claim 12 wherein said at least one sieve bag aperture and said impervious bag aperture are mutually removably attached by means of adhesive points around said at least one sieve bag aperture and said impervious bag aperture.

15. The sanitary cat litter box of claim 9 wherein six said sieve bags are packaged nested within said impervious bag, whereby one said sieve bag containing cat waste may be removed each day, and said impervious bag containing any remaining cat litter and cat waste may be removed on a seventh day.

16. A method of use for a sanitary cat litter box, said sanitary cat litter box comprising a box top sized to frictionally fit onto a box bottom, an impervious bag sized to fit into said box bottom, at least one sieve bag sized to nest into said impervious bag, said box bottom comprising a box mouth and a box aperture, said impervious bag comprising an impervious bag mouth and an impervious bag aperture, each said sieve bag comprising a sieve bag mouth and a sieve bag aperture, said impervious bag mouth and said sieve bag mouth co-extending with said box mouth, said impervious bag aperture and said sieve bag aperture co-extending with said box aperture, means of holding said impervious bag mouth and each said sieve bag mouth co-extensive with said box mouth, and means of holding said impervious bag aperture and each said sieve bag aperture co-extensive with said box aperture, said method of use comprising the steps of:

A. Nesting at least one said sieve bag within said impervious bag;

B. Placing said at least one sieve bag nested within said impervious bag within said box bottom;

C. Attaching said impervious bag aperture and said at least one sieve bag aperture to said box bottom at said box aperture;

D. Placing clumping cat litter within a top said sieve bag;

E. Attaching said impervious bag mouth and each said sieve bag mouth to said box bottom at said box mouth and positioning said box top on said box bottom;

F. Removing said box top and a single said sieve bag, along with any cat litter clumps and cat waste contained in the single said sieve bag, discarding the single said sieve bag thus removed, and re-attaching said impervious bag mouth and the remaining said sieve bag mouth(s) to said box bottom at said box mouth as specified in step E above;

G. Repeating step F until only said impervious bag remains within said sanitary cat litter box; and H. Removing said box top and said impervious bag containing the remaining cat litter and any cat litter clumps and cat waste, and discarding said impervious bag along with its contents.

17. The method of use for a sanitary cat litter box of claim 16 wherein step F is repeated six times.

\* \* \* \* \*